(12) United States Patent
Boschma, Jr. et al.

(10) Patent No.: US 7,219,854 B2
(45) Date of Patent: May 22, 2007

(54) CYCLOIDAL HYBRID ADVANCED SURFACE EFFECTS VEHICLE

(75) Inventors: James H. Boschma, Jr., Huntsville, AL (US); Michael McNabb, Huntsville, AL (US)

(73) Assignee: Information Systems Laboratories, Inc., San Diego, CA (US)

( * ) Notice: Subject to any disclaimer, the term of this patent is extended or adjusted under 35 U.S.C. 154(b) by 56 days.

(21) Appl. No.: 11/072,219

(22) Filed: Mar. 4, 2005

(65) Prior Publication Data

US 2006/0196992 A1    Sep. 7, 2006

(51) Int. Cl.
*B64C 17/08* (2006.01)
*B64C 27/22* (2006.01)

(52) U.S. Cl. .......... 244/5; 244/9; 244/10; 244/19; 180/116; 180/117; 114/67 A

(58) Field of Classification Search .......... 244/9, 244/10, 13, 5, 19, 27, 70; 180/116, 117
See application file for complete search history.

(56) References Cited

U.S. PATENT DOCUMENTS

| | | | |
|---|---|---|---|
| 1,264,152 A | | 4/1918 | Briggs |
| 1,656,492 A | | 1/1928 | Moineau |
| 2,413,460 A | * | 12/1946 | Main .................. 244/9 |
| 2,507,657 A | * | 5/1950 | Wiessler .............. 244/9 |
| 3,856,238 A | * | 12/1974 | Malvestuto, Jr. ........ 244/5 |
| 3,913,871 A | * | 10/1975 | Miller ................. 244/5 |
| 4,052,025 A | * | 10/1977 | Clark et al. ........... 244/25 |
| 4,071,207 A | * | 1/1978 | Piasecki et al. ........ 244/23 D |
| 4,194,707 A | * | 3/1980 | Sharpe ................ 244/9 |
| 4,210,299 A | * | 7/1980 | Chabonat ............. 244/20 |
| 4,417,708 A | | 11/1983 | Negri |
| 4,482,110 A | * | 11/1984 | Crimmins, Jr. ......... 244/26 |
| 5,100,080 A | * | 3/1992 | Servanty .............. 244/9 |
| 5,265,827 A | * | 11/1993 | Gerhardt ............... 244/20 |
| 5,518,205 A | * | 5/1996 | Wurst et al. ........... 244/58 |
| 5,918,832 A | | 7/1999 | Zerweckh |

(Continued)

OTHER PUBLICATIONS

"The Pelican: A Big Bird for the Long Haul" by William Cole Boeing Frontiers Online vol. 01, Issue 05, Sep. 2002, http://www.boeing.com/news/frontiers/archive/2002/september/i_pw.htm.*
"concerted" The American Heritage® Dictionary of the English Language (2003) Retrieved Jun. 20, 2006, from xreferplus http://www.xreferplus.com/entry/4075430.*

*Primary Examiner*—Teri Pham Luu
*Assistant Examiner*—Joseph W. Sanderson
(74) *Attorney, Agent, or Firm*—Nydegger & Associates

(57) ABSTRACT

A "wing in ground effect" aerial vehicle includes a wing mounted on a fuselage, and two cycloidal propulsion units for providing lift, thrust and longitudinal control. Additional lift is provided by a lighter-than-air gas such as helium contained in the fuselage. Operationally, the two cycloidal propulsion units and the volume of lighter-than-air gas are concertedly regulated to achieve "wing in ground effect" flight. Importantly, the two cycloidal propulsion units may operate in one of several modes, to include a curtate mode, a prolate mode, and a fixed-wing mode. Additionally, the vehicle may hover. Also, a thruster unit is mounted on the fuselage for providing forward thrust in combination with, or in lieu of, the two cycloidal propulsion units.

20 Claims, 2 Drawing Sheets

U.S. PATENT DOCUMENTS

| | | | |
|---|---|---|---|
| 6,550,717 B1 * | 4/2003 | MacCready et al. | 244/13 |
| 6,565,037 B1 * | 5/2003 | Tonkovich | 244/5 |
| 6,719,079 B2 * | 4/2004 | Jones | 180/126 |
| 6,848,650 B2 * | 2/2005 | Hoisignton et al. | 244/13 |
| 6,860,449 B1 * | 3/2005 | Chen | 244/12.1 |
| 6,932,296 B2 * | 8/2005 | Tierney | 244/9 |

* cited by examiner

CYCLOIDAL HYBRID ADVANCED SURFACE EFFECTS VEHICLE

FIELD OF THE INVENTION

The present invention pertains generally to aerial vehicles. More particularly, the present invention pertains to "wing in ground effect" aerial vehicles. The present invention is particularly, but not exclusively, useful as a "wing in ground effect" aerial vehicle having a plurality of cycloidal propulsion units for providing thrust, lift and longitudinal stability.

BACKGROUND OF THE INVENTION

Traditionally, the long-range transport of civilian and military cargo has been accomplished by either sea lift assets or large cargo-carrying aircraft. In the case of ocean-going vessels, large port facilities are required. Also, the time required to transport cargo by sea for long distances can be significant. In the case of large cargo-carrying aircraft, the size of the payload is limited. With this as a limitation, the costs to operate such aircraft (e.g. maintenance and fuel costs) can be prohibitive. The air transport of cargo, however, is relatively fast. Airframe designers, therefore, continue to look for ways to maximize the cargo carrying capability of aircraft, while maintaining or improving on the fuel efficiency and transport range of these aircraft. Typically, the engineering options that are considered include designing lighter aircraft, designing aircraft with more efficient engines, and designing aircraft with greater fuel carrying capability. Yet another option has been to develop aircraft that take advantage of certain natural phenomena associated with winged flight, specifically surface effects or "wing-in-ground" (WIG) effects.

To better understand the operational advantages and limitations of WIG vehicles or aircraft, it is important to first understand the underlying aerodynamics of the "wing in ground" effect. In general, when a fixed-wing aircraft flies near the earth's surface, an air cushion is created between the underside of the wing and the ground. In this flight environment, the air cushion imparts lift to the aircraft, while at the same time reducing drag on the aircraft. In actuality, the air cushion effect results from two physical phenomena often respectively referred to as "chord-dominated ground effect" and "span-dominated ground effect". In particular, chord-dominated ground effect acts to increase the lift of the aircraft, while span-dominated ground effect acts to reduce the induced drag on the aircraft. The combined effect of the two phenomena is to increase the lift to drag, or L/D ratio, thereby allowing for more efficient flight on the "cushion of air".

As can be appreciated by the skilled artisan, the span-dominated ground effect is most apparent in aircraft with a high aspect ratio wing. Specifically, the higher the aspect ratio, which is the wingspan divided by the average chord length of the wing, the lower the induced drag will be. Notably, as the wing gets closer to the earth's surface and the wing vortices are constrained and weakened at the wing tips, the "effective" aspect ratio of the wing increases beyond the geometric aspect ratio. As a result of the increase in this "effective" aspect ratio, the induced drag is reduced. Also, a reduction in drag is most pronounced when the ratio of the aircraft operational altitude to the length of the wingspan is on the order of 1:10. It can be mathematically shown that the net result of an increased "effective" aspect ratio, and a decreased aircraft altitude-to-wingspan ratio, can be a reduction in induced drag by as much as 50%.

Chord-dominated ground effect relies primarily on the fact that pressure under the wing increases as the aircraft flies nearer to the ground. Therefore, as the aircraft-to-ground distance decreases, the lift imparted to the aircraft from higher pressures under the wing significantly increases. Due to these combined effects (i.e. span dominated and chord dominated ground effects), WIG vehicles are able to transport heavier loads further, using less power and less fuel than would be possible for flight out of ground effect. Not surprisingly, WIG vehicles normally operate over water, where it is possible to fly close to the surface of the earth for extended distances without encountering obstructions.

A critical design concern for WIG vehicles is longitudinal stability and control as the aircraft transitions from WIG dominated flight to "free flight" at higher altitudes. In the transition between WIG flight and "free" flight, WIG vehicles have a tendency to dramatically "pitch up." Traditional WIG designs have compensated for this "pitch moment" by employing various techniques for aerodynamic pitch control well known in the aircraft industry, to include: using very large vertical tail planes; optimizing the vehicle center of gravity; and modifying the wing design. Although many of these solutions are effective at controlling "pitch up," many also increase the vehicle weight which adversely impacts both fuel efficiency and power.

In light of the above, it is an object of the present invention to provide an aerial vehicle that takes advantage of the "wing-in-ground effect" to optimize lift capability, vehicle speed, fuel efficiency and operating range. Another object of the present invention is to provide an aerial vehicle that integrates "lighter-than-air" lift and cycloidal propulsion subsystems into a WIG vehicle. Still another object of the present invention is to provide an aerial vehicle with improved longitudinal stability and control. Yet another object of the present invention is to provide an aerial vehicle that is simple to operate, relatively easy to manufacture, and comparatively cost effective.

SUMMARY OF THE INVENTION

The aerial vehicle of the present invention includes a fuselage which defines a longitudinal axis. Preferably, the fuselage is comprised of two pods, wherein the first pod is juxtaposed with and is parallel to the second pod. Further, the two pods are positioned an equal distance, in opposite directions, from a plane of symmetry containing the longitudinal axis. Also, each pod of the fuselage is formed with an interior chamber for receiving and containing a lighter-than-air gas such as helium.

In addition to the two pods, the vehicle includes a wing that is fixedly mounted on the fuselage and is substantially symmetrical relative to the plane of symmetry. Also mounted on the fuselage are two cylindrical-shaped cycloidal propulsion units that are positioned between the two pods. More specifically, each unit is oriented with its longitudinal axis substantially perpendicular to the plane of symmetry. Further, one propulsion unit is positioned forward from the center of the fuselage, while the other propulsion unit is positioned aft of the center of the fuselage.

In addition to the two cycloidal propulsion units, the vehicle also includes a pair of thruster units that are mounted at the aft end of the fuselage. In the preferred embodiment of the present invention, a respective thruster unit is mounted on the aft end of each of the two pods. Although the thruster units are positioned to provide forward thrust for the vehicle, they are also able to provide some turning and directional control for the vehicle.

In addition to the propulsion units disclosed above, a cargo container is also mounted on the vehicle between the pods of the fuselage. In particular, the cargo container is a generally airfoil-shaped container mounted between the two pods and positioned aft of the forward cycloidal propulsion unit.

With specific regard to the two cycloidal propulsion units, the primary and secondary hub assemblies of each unit are selectively controlled to rotate about a hub axis of rotation that is perpendicular to the plane of symmetry. In each unit, a plurality of airfoil shaped blades extend between, and are attached to, the two hub assemblies for rotation therewith. Additionally, each blade is supported by a center guide that allows each blade to individually rotate about its own blade axis. Within this configuration, the two cycloidal propulsion units can be set to operate in one of three modes of operation. As more fully disclosed in co-pending U.S. patent application Ser. No. 10/690,284 which issued to Tierney and is assigned to the same assignee as the present invention, these three modes of operation are a curtate mode, a prolate mode, and a fixed-wing mode. In the curtate and the prolate modes of operation, the two hub assemblies of each cycloidal propulsion unit rotate about their respective axis of rotation. Also, in addition to their rotation with the hub assemblies, the blades are individually rotated in a predetermined manner about their own blade axis. Consequently, in these two modes, the rotation of the hub assemblies and the independent rotation of the blades provide the aerial vehicle with thrust, lift, and longitudinal stability. In the fixed-wing mode of operation, however, the hub assemblies of the cycloidal propulsion units are not rotated. Instead, in the fixed-wing mode, the substantially stationary blades are controlled only to provide vertical lift and longitudinal stability. Accordingly, the thrust necessary to propel the vehicle forward, in the fixed-wing mode of operation, is provided by the thruster units.

As indicated above, in addition to providing forward thrust in the fixed-wing mode of operation, the thruster unit may be used to assist in turning the vehicle, and to maintain directional control during flight. Further, the thruster unit may be used to turn the vehicle as it hovers. For the special flight condition for the hover mode, lift is provided by the combined effects of both lighter-than-air gas in the pod chambers and operation of the propulsion units in the curtate mode.

Once in flight, the vehicle flies within a specified flight envelope, close to the earth's surface. More particularly, the flight envelope is specifically selected to take maximum advantage of the wing-in-ground-effect, i.e. minimize drag and maximize vehicle lift, in all instances, the incorporation of a lighter-than-air gas in the interior chambers of the fuselage, controlled in concert with the propulsion units, adds to the lift capability of the aerial vehicle of the present invention.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
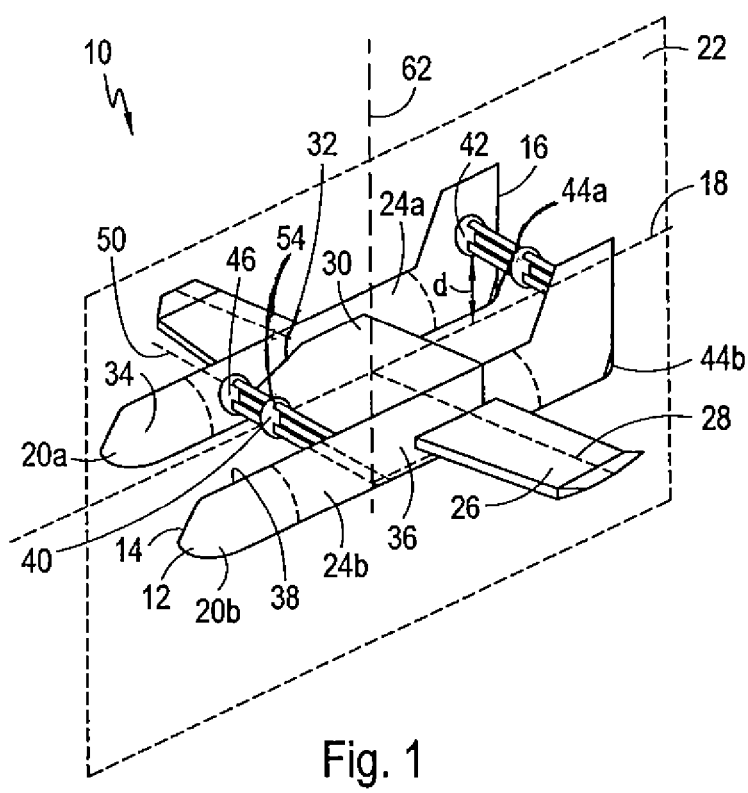
FIG. 1 is a perspective view of the aerial vehicle of the present invention.

Referring initially to FIG. 1, an aerial vehicle in accordance with the present invention is shown and is generally designated 10. As shown, the vehicle 10 includes a fuselage 12 having a forward end 14 and an aft end 16. Further, the fuselage 12 defines a longitudinal axis 18. Preferably, the fuselage 12 is comprised of two elongated pods, of which pods 20a and 20b are exemplary. As shown, pod 20a is juxtaposed with and parallel to pod 20b. Also, the two pods 20a and 20b are substantially parallel to a plane of symmetry 22 containing the longitudinal axis 18. As contemplated by the present invention, pod 20a and pod 20b are positioned on either side of the plane of symmetry 22, and they are spaced an equal distance from the plane of symmetry 22. As shown in phantom in FIG. 1, pod 20a and pod 20b are each formed with an interior chamber, chambers 24a and 24b respectively, for receiving and containing a lighter-than-air gas such as helium.

Still referring to FIG. 1, the vehicle 10 includes a wing 26 that is fixedly mounted on the fuselage 12. As shown, the wing 26 defines a wing axis 28 that is perpendicular to the longitudinal axis 18 of the fuselage 12. Also, as mounted on the fuselage 12, the wing 26 is substantially symmetrical relative to the plane of symmetry 22 and has an aspect ratio greater than 10:1. In addition to the wing 26, the vehicle includes a cargo container 30 for storing cargo to be transported by the vehicle 10. As shown in FIG. 1, the cargo container 30 is positioned generally in the center of the fuselage 12 and is mounted between pod 20a and pod 20b. More specifically, the right side 32 of the cargo container 30 is mounted on the left side 34 of pod 20a, and the left side 36 of the container 30 is mounted on the right side 38 of pod 20b.

Figure 2:
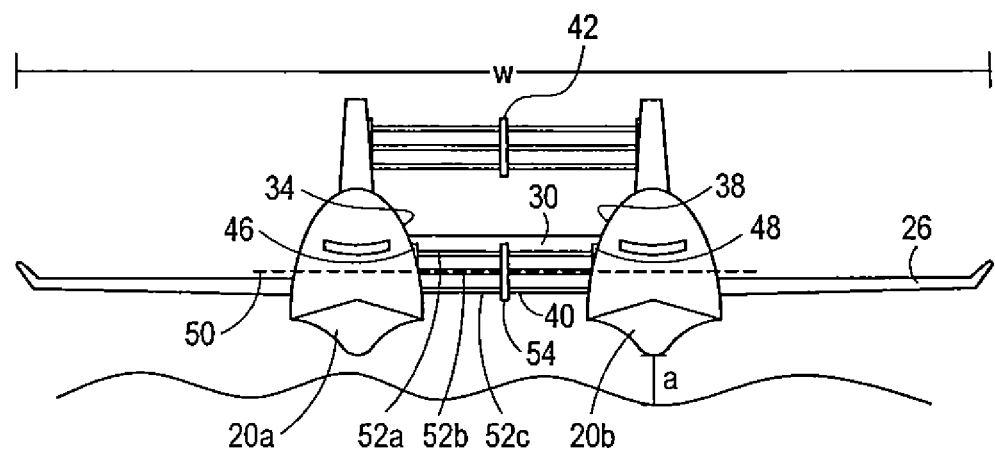
FIG. 2 is a front elevation view of the aerial vehicle of the present invention.

Cross-referencing FIG. 1 with FIG. 2, it can be seen that the aerial vehicle 10 includes a cylindrical-shaped cycloidal propulsion unit 40 that is mounted on the fuselage 12. As shown, the cycloidal propulsion unit 40 is mounted forward of the wing 26 and between pod 20a and pod 20b. More specifically, the propulsion unit 40 is mounted on the left side 34 of pod 20a and on the right side 38 of pod 20b. Further, the cycloidal propulsion unit 40 is oriented substantially perpendicular to the plane of symmetry 22. In addition to the cycloidal propulsion unit 40, the aerial vehicle 10 includes a cycloidal propulsion unit 42. As can be seen in FIG. 1, the cycloidal propulsion unit 42 is mounted aft of the wing 26 and between pod 20a and pod 20b. Similar to the propulsion unit 40, the propulsion unit 42 is mounted on the left side 34 of pod 20a and on the right side 38 of pod 20b. Additionally, the cycloidal propulsion unit 42 is oriented substantially perpendicular to the plane of symmetry 22, and it is vertically displaced from the longitudinal axis 18 by a distance "d".

Referring still to FIG. 1, the vehicle 10 of the present invention also includes a pair of thruster units 44a and 44b. Preferably, the thruster unit 44a is mounted on pod 20a, and it is positioned generally at the aft end 16 of the fuselage 12.

Additionally, the thruster unit 44b is mounted on pod 20b, also at the aft end 16 of the fuselage 12.

Considering now the cycloidal propulsion unit 40 in greater detail, it can be seen by cross-referencing FIG. 1 and FIG. 2 that the cycloidal propulsion unit 40 includes a primary hub assembly 46 that is mounted on the left side 34 of pod 20a. Further, a secondary hub assembly 48 is mounted on the right side 38 of pod 20b. Each of the two hub assemblies, 46 and 48, rotate about a same axis of rotation 50 that is substantially perpendicular to the plane of symmetry 22. As can be seen, a plurality of airfoil shaped blades, of which blades 52a, 52b, and 52c are exemplary, extend between the two hub assemblies 46 and 48 (see FIG. 2). As shown, the blades 52a, 52b and 52c are oriented substantially parallel to the axis of rotation 50. The blades 52a-c are attached to the hub assemblies 46 and 48 for rotation therewith. Further, a center guide 54 is positioned to support the blades 52a-c. As contemplated by the present invention, the center guide 54 is oriented substantially parallel to the two hub assemblies 46 and 48. Additionally, the center guide 54 is positioned equidistant from each of the hub assemblies 46 and 48, which is to say generally in the center of the length of the blades 52a-c. As shown in FIGS. 1 and 2, the blades 52a-c pass through, and are attached to, the center guide 54. In this configuration, the center guide 54 helps to maintain the separation and the orientation of the blades 52a-c as the guide 54, and the blades 52a-c, rotate about the axis of rotation 50.

As disclosed above, the vehicle 10 includes a cycloidal propulsion unit 42. As envisioned by the present invention, and as can be appreciated by referring to FIGS. 1 and 2, the cycloidal propulsion unit 42 is substantially the same as the cycloidal propulsion unit 40. Stated differently, the structure and functionality of the two cycloidal propulsion units, 40 and 42, are substantially the same.

In the operation of the present invention, the interior chambers 24a and 24b, of pod 20a and pod 20b respectively, are filled with a lighter-than-air gas such as helium prior to flight operations. An important aspect of the present invention is that the propulsion units 40 and 42 may be directed by a flight control system (not shown) to operate in one of several different modes, i.e. a curtate mode (FIG. 3A), a prolate mode (FIG. 3B), or a fixed-wing mode (FIG. 3C).

Figure 3A:
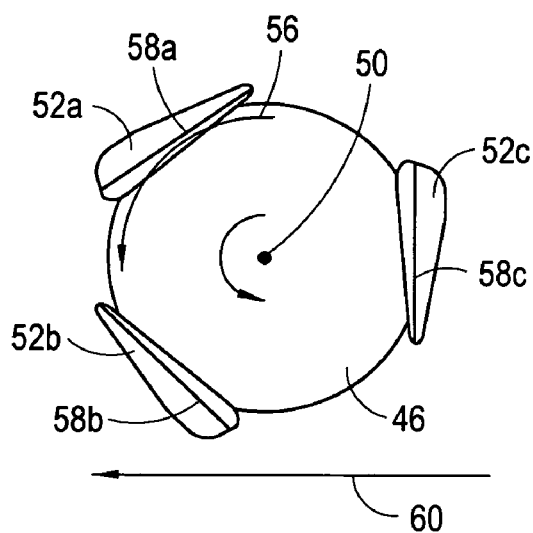
FIG. 3A is a schematic view of three airfoil shaped blades and a hub in a curtate mode of operation.

Referring now to FIG. 3A, operation of the cycloidal propulsion unit 40 in the curtate mode is shown. In this mode, the blades 52a-c rotate with the primary hub assembly 46 about the axis of rotation and travel along a circular path 56. Importantly, in the curtate mode, the blade chord lines 58a, 58b and 58c remain generally tangent to the circular path 56 as the blades 52a-c rotate about the axis 50.

Figure 3B:
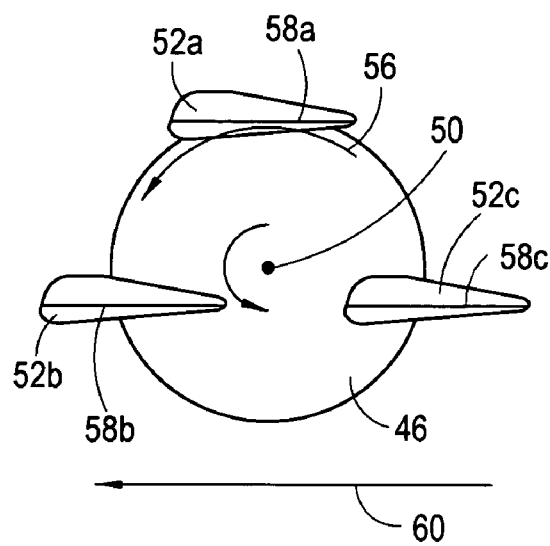
FIG. 3B is a schematic view of three airfoil shaped blades and a hub in a prolate mode of operation.

Considering now the prolate mode of operation, as shown in FIG. 3B, the primary hub assembly 46 and the blades 52a-c still rotate about the axis of rotation 50. In the prolate mode, however, the blade chord lines 58a-c remain generally parallel to the direction of flight of the vehicle 10 (indicated by arrow 60). An important aspect of the present invention is that in both the curtate mode of operation (FIG. 3A), and the prolate mode of operation (FIG. 3B), the rotation of the hub assembly 46 and the blades 52a-c provides the vehicle 10 with lift, thrust, and longitudinal stability. Further, the thruster units 44a and 44b (see FIG. 1) may also be used to provide forward thrust during the curtate and prolate modes of operation, in combination with the cycloidal propulsion units 40 and 42 (see FIG. 1).

Figure 3C:
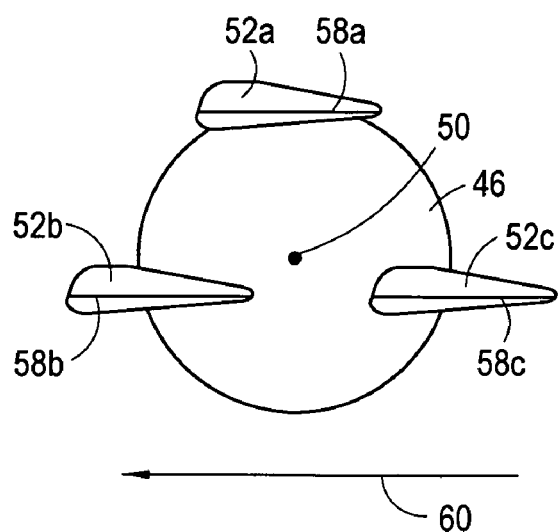
FIG. 3C is a schematic view of three airfoil shaped blades and a hub in a fixed-wing mode of operation.

In the fixed-wing mode of operation, as shown in FIG. 3C, neither the primary hub assembly 46 nor the blades 52a-c rotate about the axis of rotation 50. Instead, the hub assembly 46 and the blades 52a-c are held substantially stationary. Additionally, the blade chord lines 58a-c are maintained generally parallel to the direction of flight 60. In the fixed-wing mode of operation, the thruster units 44a and 44b may be used to assist in turning the vehicle 10, as well as providing auxiliary pitch and yaw control for maintaining directional control of the vehicle 10.

In addition to forward flight using one of the three operational modes disclosed above (i.e. curtate, prolate or fixed-wing), the vehicle 10 may also hover. While hovering, the cycloidal propulsion units 40 and 42 can be used in the curtate mode to help suspend the vehicle 10 in the air. In the hover mode, the thruster units 44a and 44b can be used to turn the vehicle 10. More particularly, the thruster units 44a and 44b are used to rotate the vehicle 10 about a vertical axis 62 (FIG. 1) which lies in the plane of symmetry 22, and which is substantially perpendicular to the longitudinal axis 18.

As envisioned by the present invention, the preferred operating altitude for the vehicle 10 is one that optimizes lift, and minimizes drag, by relying on the "wing in ground" effect. Thus, the preferred operational altitude for the vehicle 10 is one in which the altitude-to-wingspan ratio (a/w) is approximately 1:10. Referring once again to FIG. 2, the preferred wingspan "w" for the vehicle 10 is about 840 feet. In order to derive the maximum benefit from the "wing-in-ground" effect, therefore, the preferred operating altitude "a" for the aerial vehicle 10 is about 80-100 feet above the earth's surface.

While the particular Cycloidal Hybrid Advanced Surface Effects Vehicle as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A wing in-ground effect flight vehicle which comprises:
   a fuselage formed with at least one chamber filled with a volume of lighter-than-air gas to provide lift for said vehicle, said fuselage defining a longitudinal axis;
   a wing fixedly mounted on said fuselage, said wing being substantially symmetrical relative to a plane containing the axis;
   a first cycloidal propulsion unit mounted on said fuselage to operate in a selected mode for generating a first thrust vector substantially in the plane of symmetry; and
   a second cycloidal propulsion unit mounted on said fuselage to operate in a selected mode for generating a second thrust vector substantially in the plane of symmetry, wherein said second cycloidal propulsion unit is axially distanced from said first cycloidal propulsion unit and cooperates therewith to provide said wing in-ground effect flight vehicle with thrust, lift and longitudinal stability to maintain a predetermined altitude for wing-in-ground effect flight.

2. A vehicle as recited in claim 1 further comprising a thruster unit mounted on said fuselage for turning and providing auxiliary pitch and yaw control for said vehicle.

3. A vehicle as recited in claim 2 wherein said fuselage further comprises:
   a first pod formed with a first chamber, said first pod being substantially cylindrical shaped to define an axis extending substantially parallel to the longitudinal axis of said fuselage; and a second pod formed with a second chamber, said second pod being substantially cylindrical shaped to define an axis juxtaposed with and parallel to the axis of the first pod, with said first cycloidal propulsion unit and said second cycloidal propulsion unit respectively mounted on said fuselage between said first pod and said second pod.

4. A vehicle as recited in claim 3 further comprising a cargo container mounted on said fuselage between said first pod and said second pod.

5. A vehicle as recited in claim 3 wherein said first cycloidal propulsion unit comprises:
  a primary hub assembly mounted on said first pod for rotation of said primary hub assembly about an axis of rotation, wherein the axis of rotation is substantially perpendicular to the longitudinal axis of the fuselage;
  a secondary hub assembly mounted on said second pod for rotation of said secondary hub assembly about the axis of rotation; and
  a plurality of airfoil shaped blades, wherein each said blade defines a blade axis and is attached to said primary hub assembly and to said secondary hub assembly for rotation therewith and for establishing an angle of attack for each said blade, and further wherein said blade axes are oriented substantially parallel to the axis of rotation.

6. A vehicle as recited in claim 5 wherein said second cycloidal propulsion unit comprises:
  a primary hub assembly mounted on said first pod for rotation of said primary hub assembly about an axis of rotation, wherein the axis of rotation is substantially perpendicular to the longitudinal axis of the fuselage;
  a secondary hub assembly mounted on said second pod for rotation of said secondary hub assembly about the axis of rotation; and
  a plurality of airfoil shaped blades, wherein each blade defines a blade axis and is attached to said primary hub assembly and to said secondary hub assembly for rotation therewith and for establishing an angle of attack for each said blade, and further wherein said blade axes are oriented substantially parallel to the axis of rotation.

7. A vehicle as recited in claim 6 wherein said first cycloidal propulsion unit is operated in a mode of operation selected from the group consisting of a curtate mode, a prolate mode and a fixed-wing mode.

8. A vehicle as recited in claim 7 wherein said second cycloidal propulsion unit is operated in a mode of operation selected from the group consisting of a curtate mode, a prolate mode arid a fixed-wing mode.

9. A vehicle as recited in claim 8 wherein said first cycloidal propulsion unit and said second cycloidal propulsion unit are operated in the fixed-wing mode, and further wherein said thruster unit propels said vehicle.

10. A vehicle as recited in claim 8 wherein said first cycloidal propulsion unit and said second cycloidal propulsion unit are operated in the curtate mode, to hover said vehicle, and further wherein said thruster unit is used to turn said vehicle during hover.

11. A wing-in-ground effect flight vehicle which comprises:
  a fuselage defining a longitudinal axis, said fuselage having a first pod formed with a first chamber and a second pod formed with a second chamber, wherein said first pod and said second pod define respective axes, with the pod axes juxtaposed and parallel to each other, and wherein said first chamber and said second chamber are filled with a lighter-than-air gas to provide lift for said vehicle;
  a wing fixedly mounted on said fuselage, said wing being substantially symmetrical relative to a plane containing the fuselage axis;
  a first cycloidal propulsion unit for operating in a selected mode to generate a first thrust vector substantially in the plane of symmetry, wherein said first propulsion unit is mounted on said fuselage between said first pod and said second pod, and further wherein said first propulsion unit is positioned on said fuselage forward of said wing; and
  a second cycloidal propulsion unit for operating in a selected mode to generate a second thrust vector substantially in the plane of symmetry, wherein said second propulsion unit is mounted on said fuselage between said first pod and said second pod, and further wherein said second propulsion unit is positioned on said fuselage aft of said wing to cooperate with said first propulsion unit to provide said wing-in-ground effect flight vehicle with thrust, lift and longitudinal stability to maintain a predetermined altitude for wing-in-ground effect flight.

12. A vehicle as recited in claim 11 wherein said first cycloidal propulsion unit is operated in a mode of operation selected from the group consisting of a eurtate mode, a prolate mode and a fixed-wing mode.

13. A vehicle as recited in claim 12 wherein said second cycloidal propulsion unit is operated in a mode of operation selected from the group consisting of a curtate mode, a prolate mode and a fixed-wing mode.

14. A vehicle as recited in claim 13 which further comprises a thruster unit mounted on said fuselage, wherein said thruster unit provides auxiliary pitch and yaw control for said vehicle when said first and said second cycloidal propulsion units are operated in a fixed-wing mode.

15. A vehicle as recited in claim 14 wherein said thruster unit turns said vehicle when said vehicle hovers and said first and said second cycloidal propulsion units are both operated in a curtate mode.

16. A method for operating a wing-in-ground effect flight vehicle which comprises the steps of:
  filling a chamber in a fuselage of said vehicle with a volume of lighter-than-air gas to provide lift for said vehicle;
  operating a pair of cycloidal propulsion units mounted on said fuselage to respectively operate in a selected mode and provide said wing-in-ground effect flight vehicle with thrust, lift and longitudinal stability; and
  regulating said pair of cycloidal propulsion units and the volume of lighter-than-air gas to maintain a predetermined flight altitude for wing-in-ground effect flight.

17. A method as recited in claim 16 further comprising the step of operating said cycloidal propulsion units in a mode of operation selected from the group consisting of a curtate mode, a prolate mode, and a fixed-wing mode.

18. A method as recited in claim 17 further comprising the step of activating a thruster unit mounted on said fuselage to propel said vehicle forward when said cycloidal propulsion units are operated in a fixed-wing mode.

19. A method as recited in claim 18 wherein said thruster unit turns said vehicle when said vehicle hovers and said cycloidal propulsion units are operated in a curtate mode.

20. A wing-in-ground effect flight vehicle which comprises:
- a fuselage formed with at least one chamber, said fuselage defining a longitudinal axis;
- a wing having a wing span and a chord length and fixedly mounted on said fuselage, wherein said wing is substantially symmetrical relative to a plane containing the axis;
- a pair of cycloidal propulsion units for respectively operating in a selected mode to generate a air of thrust vectors substantially in the plane of symmetry and distanced from each other to provide said wing-in-ground effect flight vehicle with thrust, lift and longitudinal stability; and
- a volume of a lighter-than-air gas contained within said chamber for providing lift for said vehicle in combination with said propulsion units to maintain a predetermined altitude for wing-in-ground effect flight, wherein a ratio of the altitude to the wing span is about 1 to ten (1:10).

* * * * *

UNITED STATES PATENT AND TRADEMARK OFFICE
CERTIFICATE OF CORRECTION

PATENT NO. : 7,219,854 B2  Page 1 of 1
APPLICATION NO. : 11/072219
DATED : May 22, 2007
INVENTOR(S) : James H. Boschma, Jr. and Michael McNabb It is certified that error appears in the above-identified patent and that said Letters Patent is hereby corrected as shown below:

Column 7, Line 51
DELETE
"arid"
INSERT
-- and --

Column 9, Line 10
DELETE
"air"
INSERT
-- pair --

Signed and Sealed this

Twenty-fourth Day of July, 2007

JON W. DUDAS
*Director of the United States Patent and Trademark Office*